(12) United States Patent
Daherkar et al.

(10) Patent No.: US 9,047,144 B2
(45) Date of Patent: Jun. 2, 2015

(54) SYSTEM AND METHOD FOR PROVIDING QUALITY-OF-SERVICES IN A MULTI-EVENT PROCESSING ENVIRONMENT

(75) Inventors: Atul Ravindra Daherkar, Cedar Park, TX (US); Manoj Khangaonkar, Pleasanton, CA (US); Hong Sun, Cupertino, CA (US); Kai Mike Zhang, Lake Oswego, OR (US); Chendong Zou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 12/612,624

(22) Filed: Nov. 4, 2009

(65) Prior Publication Data

US 2011/0107354 A1    May 5, 2011

(51) Int. Cl.
*G06F 9/44* (2006.01)
*G06F 9/46* (2006.01)
*G06F 13/00* (2006.01)
*G06F 9/54* (2006.01)

(52) U.S. Cl.
CPC ........................... *G06F 9/542* (2013.01)

(58) Field of Classification Search
CPC ........................................................ G06F 9/542
See application file for complete search history.

(56) References Cited

U.S. PATENT DOCUMENTS

| | | | |
|---|---|---|---|
| 6,349,333 B1* | 2/2002 | Panikatt et al. | 709/223 |
| 6,871,224 B1* | 3/2005 | Chu et al. | 709/224 |
| 2002/0116545 A1* | 8/2002 | Mandato et al. | 709/328 |
| 2004/0049481 A1* | 3/2004 | Blevins | 707/1 |

(Continued)

FOREIGN PATENT DOCUMENTS

JP     2005-535949 A    11/2005

OTHER PUBLICATIONS

Keller et al., "The WSLA Framework: Specifying and Monitoring Service Level Agreements for Web Services", IBM Research Report, Thomas J. Watson Research Center, Yorktown Heights, NY 10598, USA, May 2002, 22 pages.

(Continued)

*Primary Examiner* — H S Sough
*Assistant Examiner* — Kimberly Jordan
(74) *Attorney, Agent, or Firm* — Sughrue Mion, PLLC

(57) ABSTRACT

A system and method for providing Quality-of-Service (QoS) functions to concurrent event-processing applications in a multi-processing database environment are described. The system includes an Event-Listener interface for determining the QoS functions applicable to the events being processed and an Event-Service interface for invoking the determined QoS functions. The Event-Service interface loads, initializes and activates the QoS functions. The QoS functions are based on service definitions. The Event-Service interface further initializes the service providers and sends the events that need QoS support to the respective service providers for processing. The QoS functions include the services commonly needed in a clustered event-processing database system like Event-Sequencing, Event-Isolation, High-Availability, Event-Filtering and Flow-Control. Other QoS functions might be added to the database system using the same interfaces provided by the invention.

26 Claims, 11 Drawing Sheets

(56) References Cited

U.S. PATENT DOCUMENTS

| | | | |
|---|---|---|---|
| 2005/0166187 A1* | 7/2005 | Das et al. | 717/136 |
| 2006/0173985 A1 | 8/2006 | Moore et al. | |
| 2008/0043669 A1 | 2/2008 | Gallagher et al. | |
| 2008/0097805 A1* | 4/2008 | Wells | 705/7 |
| 2008/0152341 A1* | 6/2008 | Hung et al. | 398/2 |
| 2009/0106276 A1* | 4/2009 | Bouchard | 707/100 |

OTHER PUBLICATIONS

Yasuhisa Takizawa et. al., "LAQoS : An Adaptive QoS Model Using Layered Structures", The Information Processing Society of Japan:Transactions on Mathematical Modeling and its Applications, Information Processing Society of Japan, May 15, 2003, vol. 44, No. SIG7(TOM8), pp. 12-25 (CS-NG-2004-01463-001).

* cited by examiner

SYSTEM AND METHOD FOR PROVIDING QUALITY-OF-SERVICES IN A MULTI-EVENT PROCESSING ENVIRONMENT

FIELD OF THE INVENTION

The invention relates generally to databases, and more particularly, to a system and method for providing Quality-of-Service (QoS) functions to concurrent event-processing applications in a multi-processing database environment.

BACKGROUND

Event-processing is a key task in database applications like those handling online reservations and financial transactions. In a banking database system, multiple events relating to a customer's bank account might need to be processed and updated to the account simultaneously. For example, the bank's automatic bill-payment service might be processing a customer's payment while the customer is making a deposit into the same account at a service window. Both the bill-payment and account deposit transactions affect the account balance once processed by the bank's system and are the events that need to be processed by the system's concurrent event-processing applications. In addition, the results from these transactions must be correctly updated in the bank's database to the correctly reflect the account balance.

Increasingly, database applications are typically hosted in clustered computer environments to accommodate large and varying workloads, and to support multiple computers in an enterprise's network. Such computer clusters facilitate workload balancing and system scaling based on user requirements. For example, a bank's database system might have multiple instances of an event-processing application running on several servers supporting the bank's various branch offices. These servers are connected to the bank's network and might be at different physical locations or at the same physical location.

Alternatively, one server might function as the main processing server while the other servers act as backup systems to the main server. In addition, other instances of the event processing application might be added to the system during periods of high user demands like on Fridays or the last few days of a month when large increases in the amount of transactions are expected.

Due to the concurrency of the event-processing applications, Quality-of-Service features are generally desired to handle system problems such as fail-overs, racing conditions and poor system performance caused by unbalanced workload allocation while the events are being processed. Currently, these Quality-of-Service functions are individually developed and embedded in the event-processing applications or the middleware supporting the applications. For example, in the WebSphere products offered by the International Business Machines corporation of Armonk, N.Y., these services are handled individually and built into the products.

From the foregoing, it is appreciated that there exists a need for a system and method for providing Quality-of-Service functions to concurrent event-processing applications in a database environment without the aforementioned drawbacks.

SUMMARY

The invention is directed to a system and method for providing Quality-of-Service functions in a multi-processing environment that has multiple event-processing applications running concurrently. Each event-processing application includes an Event-Listener interface and an Event-Service interface. The Event-Service interface is accessible from the Event-Listener interface. During the processing of incoming events, the Event-Listener interface identifies those events that need Quality-of-Service functions and invokes the Event-Service interface for providing the applicable Quality-of-Service functions. The Event-Service interface sends those events to the appropriate service providers which then supply the desired Quality-of-Service features to the event-processing application that need the features.

The Event-Service interface includes a component for loading the Quality-of-Service function into memory and activating the function when the Event-Service interface is invoked to provide support. A Quality-of-Service function is generally a service that helps prevent or handle a particular problem while the events are being processed to improve the overall performance of the system. For example, the Quality-of-Service function might be an Event-Sequencing service for managing the order of events being processed by the concurrent applications. In certain types of events like those relating to financial transactions, the order of the events being processed is very important as it often affects the processing results. Another Quality-of-Service might be an Event-Isolation function for closely managing the processing of related events that could potentially cause a racing condition in the system. A racing condition occurs when the system resources cannot correctly process two events at the same time. A concurrent processing of both events would produce inconsistent results. To avoid a racing condition, the processing of one event cannot start until the processing of the other event has finished.

The system further includes a High-Availability Quality-of-Service function for handling fail-over conditions in order to avoid lost events and duplicated events. Another Quality-of-Service function provided by the system of the invention is an Event-Filtering service for selectively applying a Quality-of-Service function to a subset of events, rather than to all incoming events, to improve the overall performance of the system. In addition, a Flow-Control Quality-of-Service function is provided to monitor and control the rate of the incoming events being processed by the applications, so that the system is not overwhelmed by a large influx of events.

In another aspect of the invention, a computer implemented method is described for providing Quality-of-Service functions in a multi-processing environment that has multiple concurrent event-processing applications running concurrently. The method preferably includes the steps of identifying a Quality-of-Service function applicable to an application through an Event-Listener interface and invoking the Quality-of-Service function through an Event-Service interface. The Event-Listener interface is associated with the event-processing application and has access to the Event-Service interface.

In preferred embodiments of the invention, the method provides a set of Quality-of-Service functions that are commonly needed by the concurrent event-processing applications. The Quality-of-Service functions in the preferred embodiments include Event-Sequencing, Event-Isolation, High-Availability, Event-Filtering and Flow-Control. Additional Quality-of-Service functions may be similarly implemented and invoked using the Event-Listener interface and Event-Service interface.

The method further comprises the steps of loading and activating a Quality-of-Service function when the Event-Service interface invokes a Quality-of-Service function. The activation of the Quality-Of-Service function includes the initialization of the declared services. When the Event-Service interface determines that an event needs a Quality-of-Service function, the method of the invention loads the service provider associated with the service function and sends the event to the service provider for processing.

In yet another aspect of the invention, a computer program product is described for providing Quality-of-Service functions to concurrent event-processing applications in a multi-processing environment. The product includes a computer usable storage medium on which readable program code is stored. The code is operable to identify a Quality-of-Service function applicable to an event-processing application through an Event-Listener interface and invoke the service function through an Event-Service interface. The Event-Listener and Event-Service interfaces are associated with an event-processing application, where the Event-Service interface is accessible from the Event-Listener interface during the processing of the incoming events.

The details of the preferred embodiments of the invention, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION OF THE INVENTION

Figure 1:
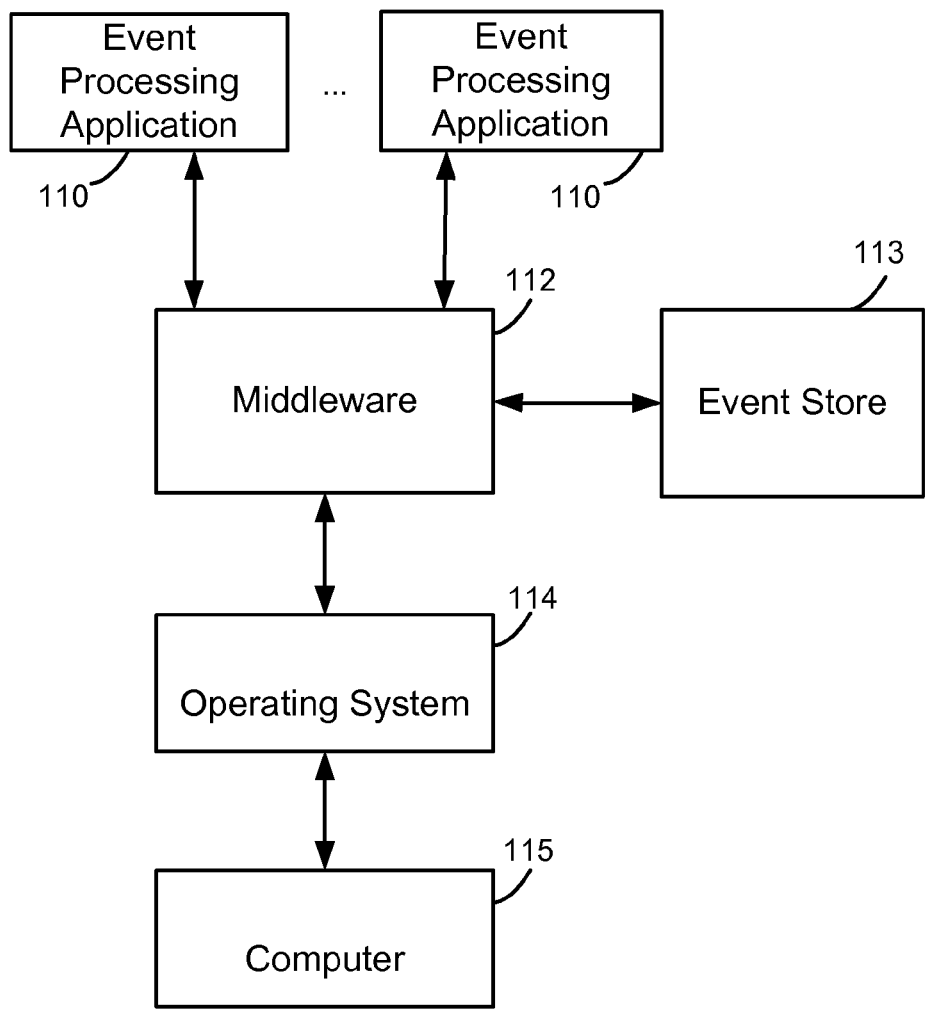
FIG. 1 is a block diagram illustrating a database environment in which aspects of the invention are applicable.

The invention relates generally to a system and method for providing Quality-of-Service functions to event-processing applications in a database environment. More specifically, the invention provides a framework for identifying and invoking a Quality-of-Service function for an event-processing application in a multi-processing database environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a high-level block diagram of a multi-processing database environment in which aspects of the invention might be included. Interfacing with a computer 115 at the basic software level is an operating system 114. There is typically a middleware platform 112 through which multiple and different user applications interact with the operating system 114. An example of a middleware platform 112 is the WebSphere product line offered by International Business Machines corporation of Armonk, N.Y.

There are multiple event-processing applications 110 running concurrently and interfacing with the middleware platform 112. The middleware platform 112 might access an event store 113 to retrieve data items from the event store 113, deposit new data items into the data store 113, or update existing data items in the data store 113. During the processing of the events, the middleware platform 112 might obtain data from the data store 113 to provide data to the event-processing applications 110 as well as receiving data from the event-processing applications 110 and depositing the data into the data store 113.

Figure 2:
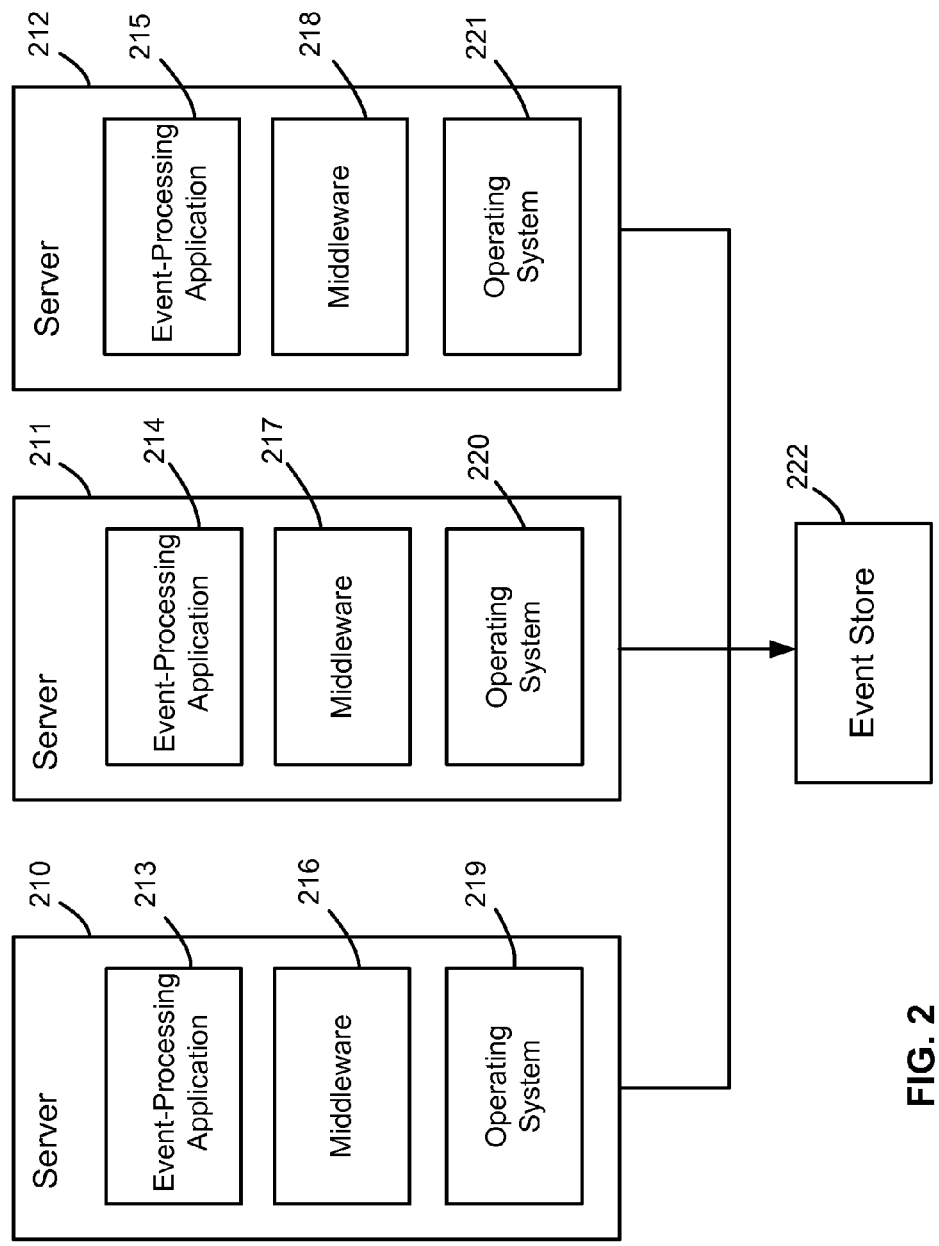
FIG. 2 is a block diagram illustrating a database environment having multiple servers operating in a cluster, each running a query processing application in which aspects of the invention might be provided.

FIG. 2 is a block diagram illustrating a clustered computing environment in which aspects of the invention might be practiced. As an example, the clustered computing environment in FIG. 2 includes three servers 210, 211 and 212, but may have more servers depending on the requirements of the users and the environment. Each server has an instance of an event-processing application that runs on top of a middleware platform. The middleware platform in turn interfaces with the server's operating system. For example, in the server 210, an event-processing application 213 interacts with a middleware platform 216, which in turn interfaces with the server's operating system 219. Similarly, the servers 211 and 212 host the event-processing applications 214 and 215, respectively. The applications 214 and 215 interact with the operation systems 220 and 221 through the middleware platforms 217 and 218, respectively.

FIG. 2 further shows an event store 222 for maintaining the event data that might be generated by the event-processing applications 210 through 212, as well as for providing data to these applications while they process the events. The event store 222 is sometimes referred to as a data store or generally as a database.

Figure 3:
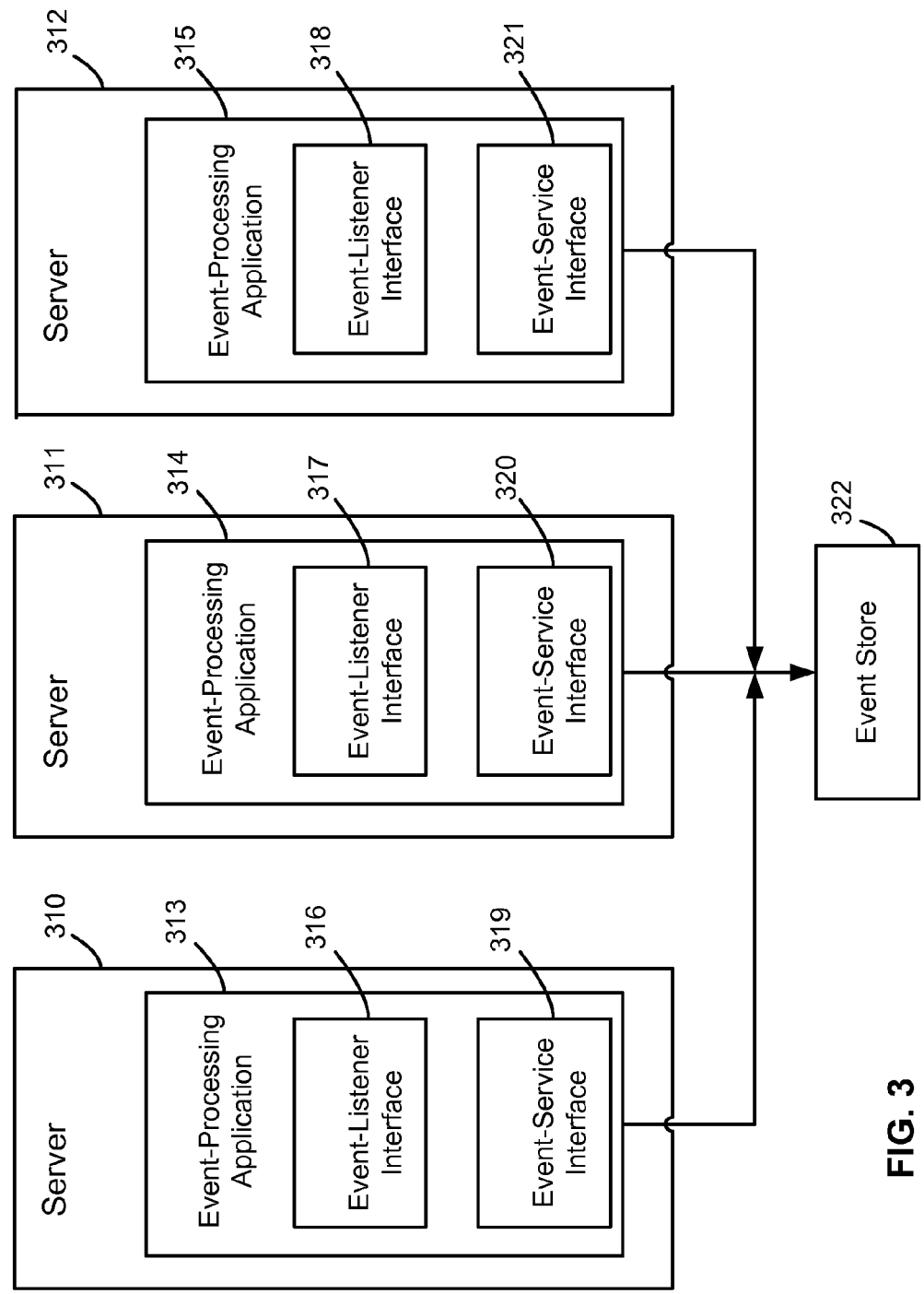
FIG. 3 is a block diagram showing the key interfaces in each query processing application in a cluster environment, for providing Quality-of-Service functions, in accordance with aspects of the invention.

FIG. 3 is a block diagram showing a preferred embodiment of an event-processing system for providing Quality-of-Service functions in a multi-processing environment in accordance with the invention. Similar to the system in FIG. 2, the computing environment in FIG. 3 is a clustered computing environment having three servers 310 through 312. Each of the servers 310-312 hosts an event-processing application, 313 through 315. The event-processing applications 313 through 315 store event data into and retrieve data from an event store 322.

Each of the event-processing applications 313-315 preferably includes an Event-Listener interface for identifying an event being processed by the application that needs Quality-of-Service support. In addition, each of the event-processing applications 313-315 preferably has an Event-Service interface for invoking the appropriate Quality-of-Service functions for the event being processed. For example, the event-processing application 313 includes an Event-Listener interface 316 and an Event-Service interface 319. Likewise, the event-processing applications 314 and 315 include the Event-Listener interfaces 317 and 318, and Event-Service interfaces 320 and 321, respectively. Further details of the Event-Listener interfaces 316-318 and Event-Service interfaces 319-321 are described below in reference to FIGS. 9-11.

Figure 4:
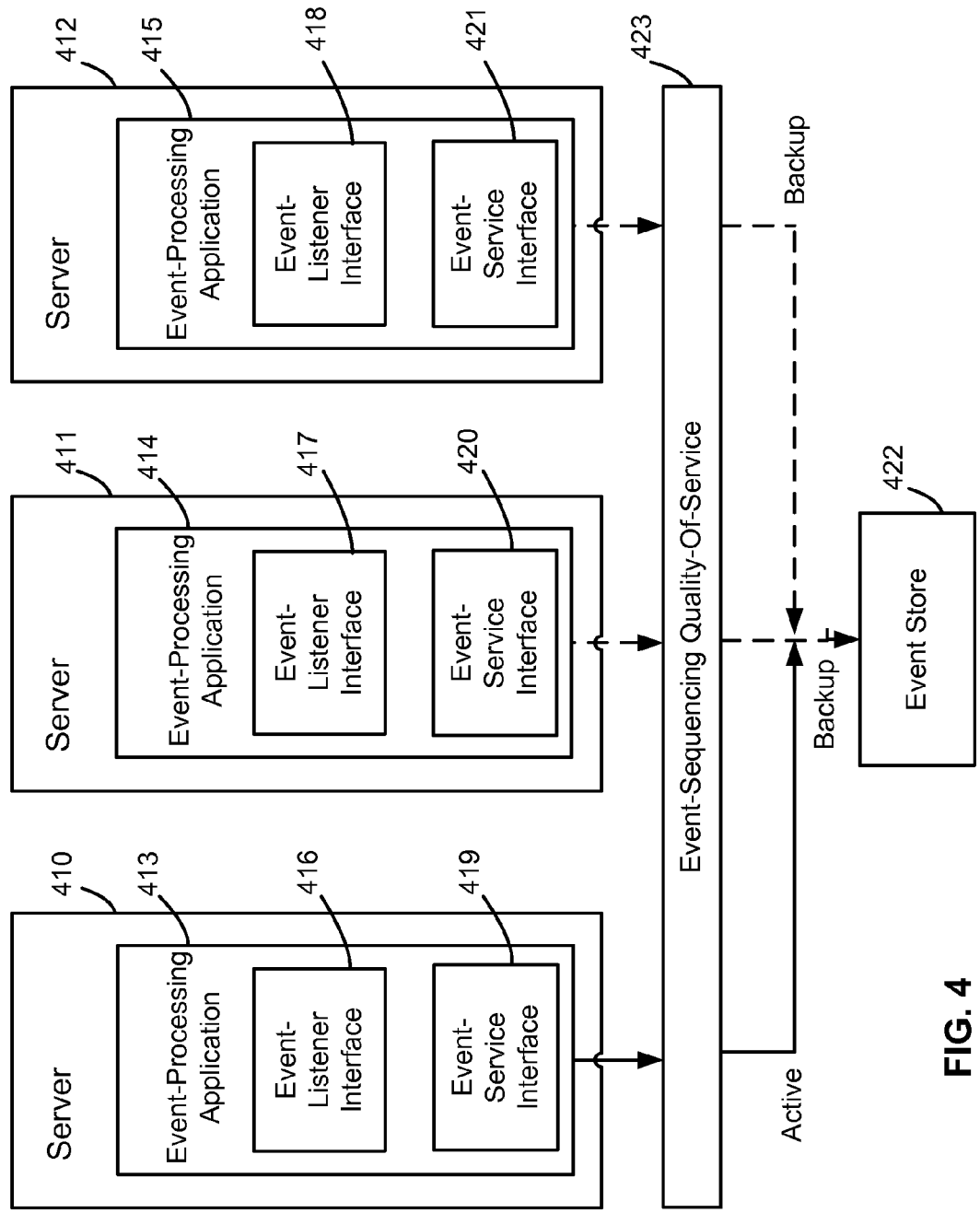
FIG. 4 is a block diagram showing the Event-Sequencing Quality-of-Service function supporting the query processing applications in a cluster environment, in accordance with aspects of the invention.

FIG. 4 is a block diagram illustrating a preferred embodiment of the invention that has a Quality-of-Service function 423, referred to as Event-Sequencing, for supporting the event-processing applications 413-415. The event-processing applications 413-415 include the Event-Listener interfaces 416-418 and Event-Service interfaces 419-421, respectively. These interfaces have been described above in reference to FIG. 3. The Event-Sequencing Quality-of-Service function 423 is shown separately from event-processing applications 413-415 for clarity and also to illustrate its commonality among the event-processing applications 413-415. Alternatively, the Event-Sequencing Quality-of-Service function 423 might be part of a database container. In another embodiment of the invention, the Event-Sequencing Quality-of-Service function 423 might be part of the middleware that supports the event-processing applications.

The Event-Sequencing Quality-of-Service function 423 is responsible for managing the order of the incoming events being processed by the applications 413-415 to assure consistent results from the processing. There are multiple options for ensuring the order of the events being processed. One option is to use a single thread of events to be processed at the entry point into the system. Another option is to associate a tag or a time-stamp with each event at its source and rely on the event tags or event timestamps to determine to sequence of the events to be processed. However, in an integrated event-processing system, the sources and data stores of some events are often not under the control of the middleware at run-time. As the result, tagging and time-stamping all events may not be feasible. The single event thread is thus the preferred option for implementing the Event-Sequencing Quality-of-Service function.

Figure 5:
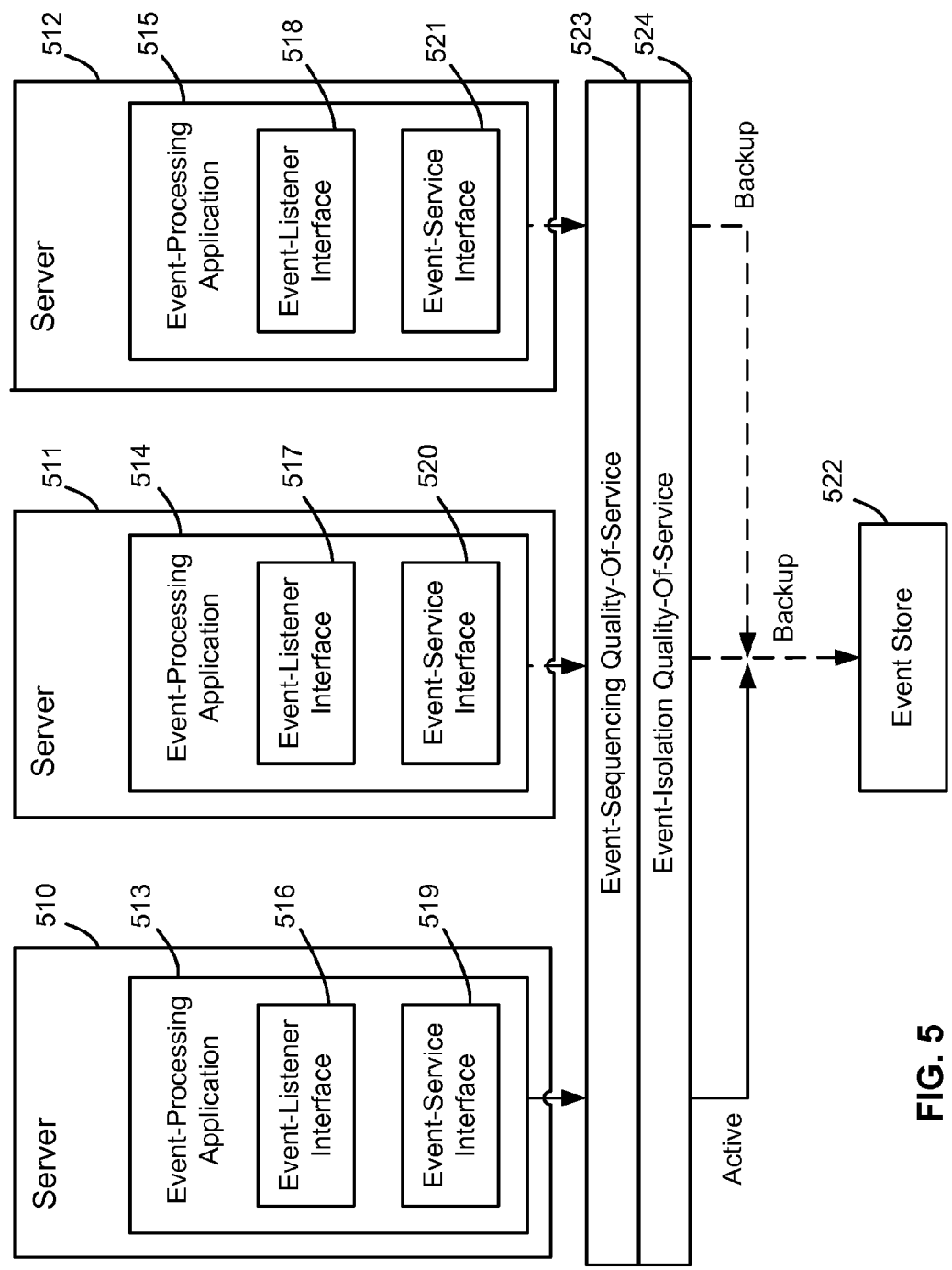
FIG. 5 is a block diagram showing the Event-Sequencing and Event-Isolation Quality-of-Service functions supporting the query processing applications in a cluster environment, in accordance with aspects of the invention.

FIG. 5 is a block diagram illustrating a preferred embodiment of a system for providing Quality-of-Services similar to the system described in FIG. 4, but with an additional Quality-of-Service function 524 named Event-Isolation. As in FIG. 4, the server 510 is an active server while the servers 511 and 512 are its backup systems. The description of the other components of the system in FIG. 5 has been provided above in reference to FIG. 4 and will not be repeated here. The main purpose of the Event-Isolation Quality-of-Service function 524 is to prevent racing conditions among the event-processing. A racing condition is a situation in which a concurrent processing of two events would produce an incorrect or inconsistent result. As a result, the processing of one event may not start until the processing of the other event has finished. An example of where a racing condition might occur is in the processing of two bank transactions that both update the same bank account. If both transactions are concurrently processed by two separate event-processing applications, the results concerning the account that were produced by these applications would often be inconsistent and unreliable.

Figure 6:
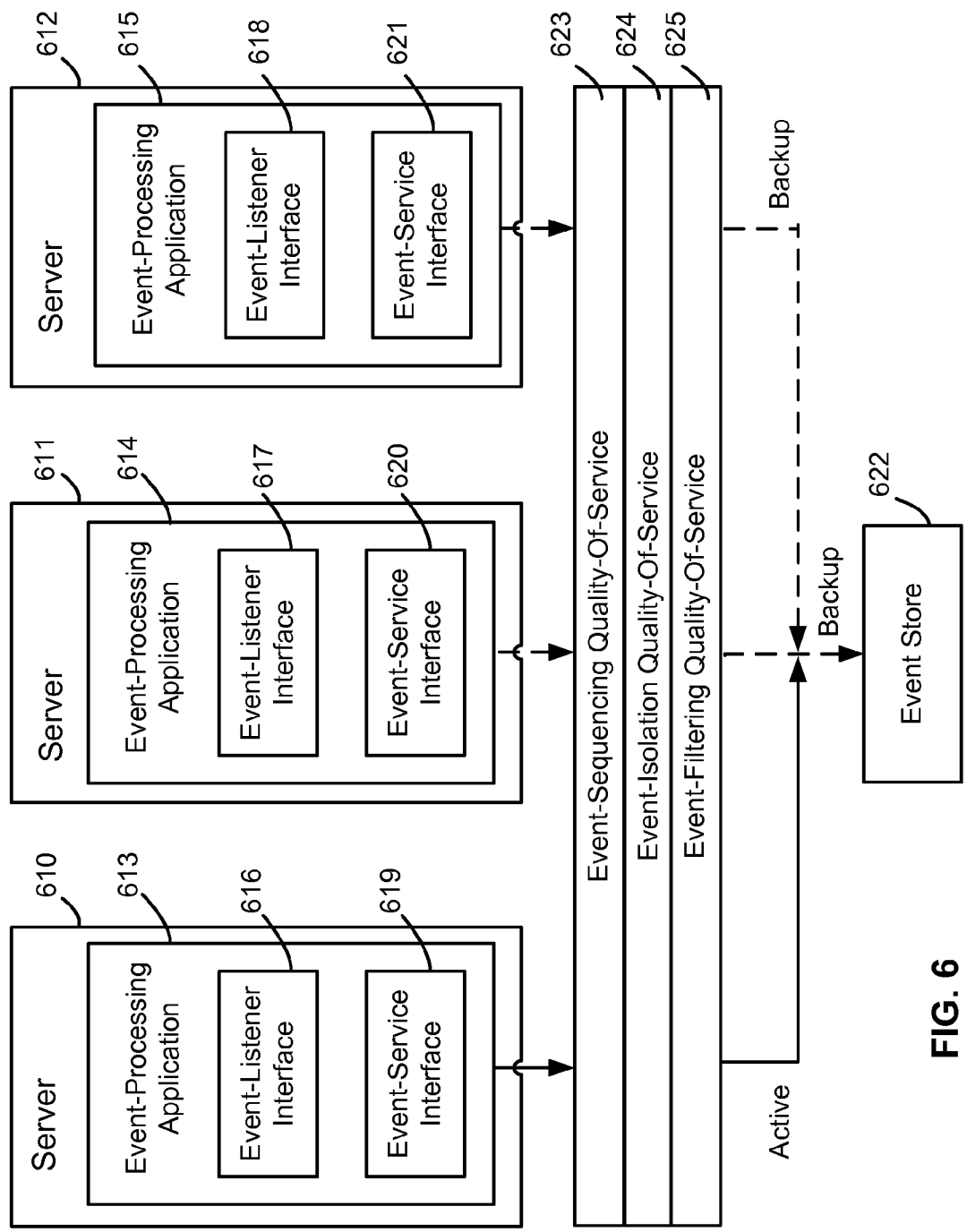
FIG. 6 is a block diagram showing the Event-Sequencing, Event-Isolation, and Event-Filtering Quality-of-Service functions supporting the query processing applications in a cluster environment, in accordance with aspects of the invention.

FIG. 6 is a block diagram illustrating a preferred embodiment of a system for providing Quality-of-Services similar to the system described in FIG. 5, but with an additional Quality-of-Service function 625, referred to as Event-Filtering. As shown in FIG. 5, the server 610 is an active server while the servers 611 and 612 are the backup systems for the server 610. The description of the other components in the system has been provided in reference to FIGS. 4-5. The Event-Filtering function 625 is invoked by the event-processing applications 613-615 to apply a particular Quality-of-Service function to the processing of a selected subset of the incoming events for the purpose of improving the overall system performance. This Quality-of-Service function might be deemed irrelevant to the other incoming events being processed and is therefore not invoked for these events. As a result, the system's computing resources could be efficiently directed to the events that actually need the service.

For example, the Event-Sequencing 623 and Event-Isolation 624 functions described above are typically needed when the applications process the events that update information on a single account or an individual, as in a bank account. This type of events might account for only a small fraction of the incoming events that are processed by the applications. The Event-Filtering service 625 thus could significantly improve the system's performance by selectively applying these two Quality-Of-Services to a small group of events that update information on an account or an individual, rather than to all events.

Figure 7:
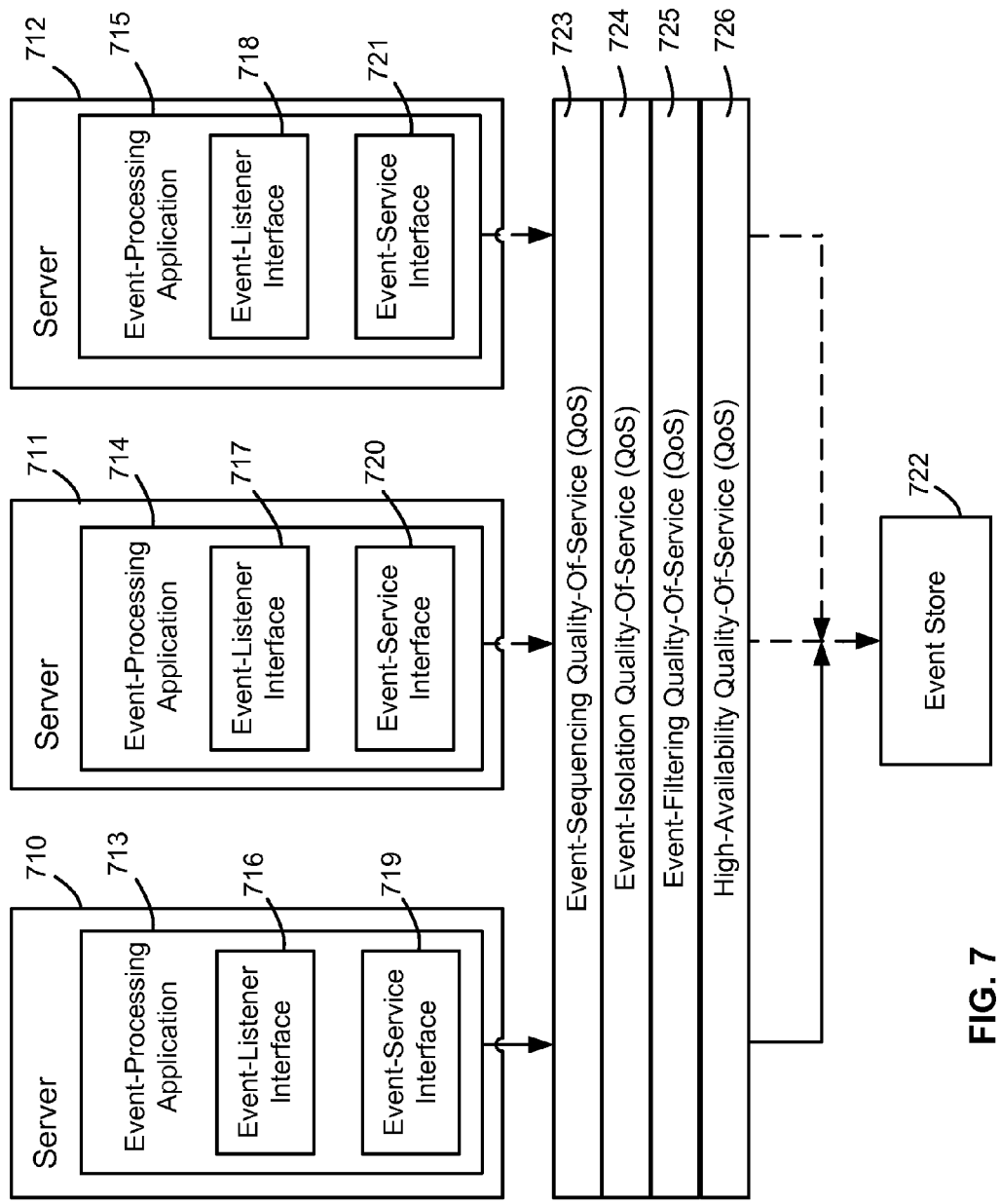
FIG. 7 is a block diagram showing the Event-Sequencing, Event-Isolation, Event-Filtering and High-Availability Quality-of-Service functions supporting the query processing applications in a cluster environment, in accordance with aspects of the invention.

FIG. 7 is a block diagram showing a preferred embodiment of a system for providing Quality-of-Services similar to the system described in FIG. 6, but with an additional Quality-of-Service function 726 named High-Availability. The description of the other components in the system has been provided in reference to FIGS. 4-6 and will not be repeated here. The High-Availability Quality-of-Service 726 is used by the event-processing applications 713-715 to handle system fail-over conditions and to avoid losing events and duplicated processing of the same events.

As an example, consider the Quality-of-Service Event-Sequencing 723 and Event-Isolation 724 functions which might be invoked by the applications 713-715 to control the order of the events being processed and to avoid processing two events concurrently. One possible method for achieving these objectives is for the system to retrieve the incoming events in a single thread. However, such a single event thread is susceptible to system fail-overs, i.e., single-point failures in the system, which might lead to some events being lost and other events being processed more than once after the system recovers from the fail-overs. The High-Availability Quality-of-Service function 726 addresses fail-over conditions by providing backup processing channels, as represented by the paths from event-processing applications 714 and 715 to the High-Availability Quality-of-Service function 726.

Figure 8:
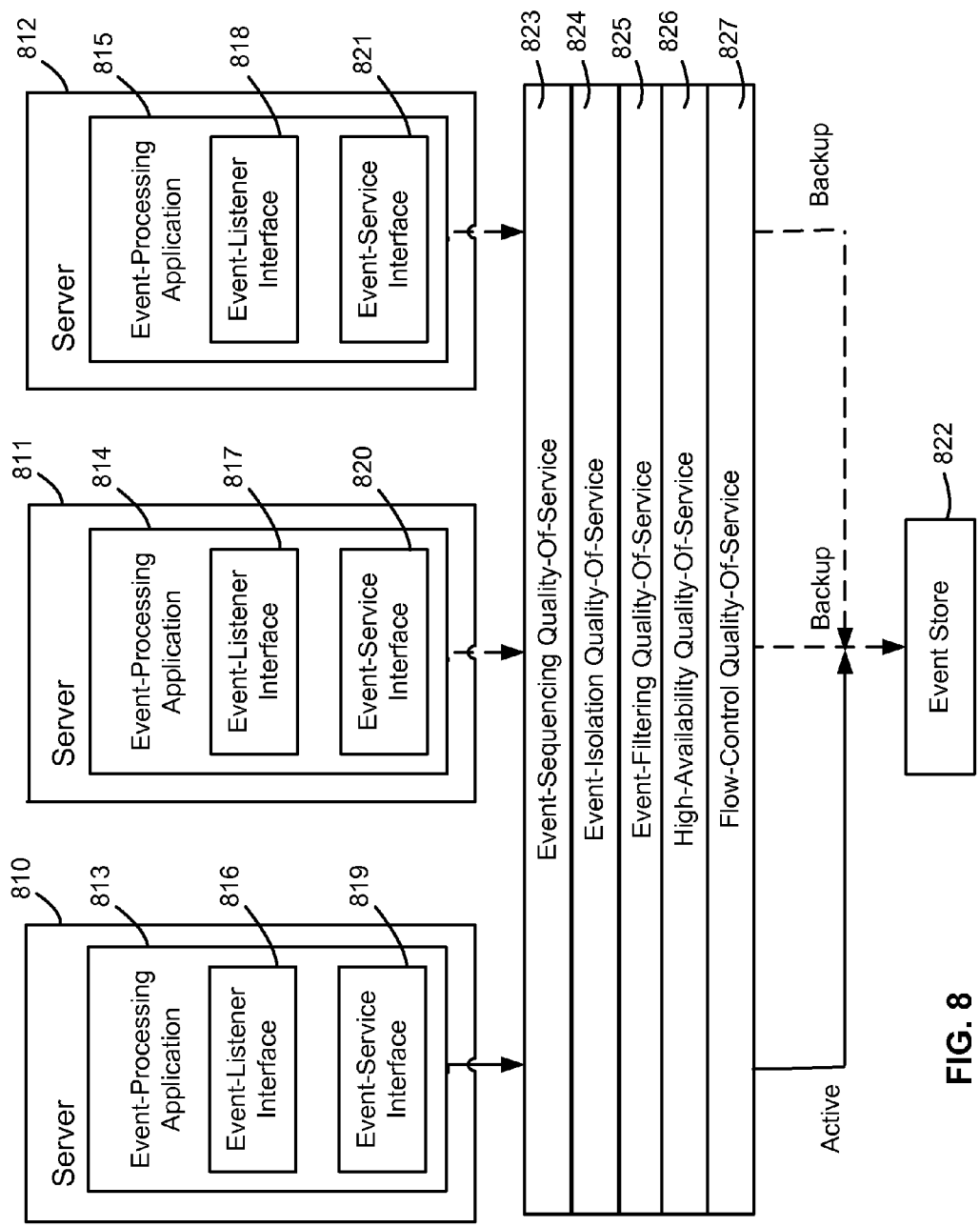
FIG. 8 is a block diagram showing the Event-Sequencing, Event-Isolation, Event-Filtering, High-Availability and Flow-Control Quality-of-Service functions supporting the query processing applications in a cluster environment, in accordance with aspects of the invention.

FIG. 8 is a block diagram illustrating a preferred embodiment of a system for providing Quality-of-Services similar to the system described in FIG. 7, but with an additional Quality-of-Service function Flow-Control 827. The description for the other components in the system has been provided in reference to FIGS. 4-7. The Flow-Control Quality-of-Service 827 is used by the event-processing applications 813-815 to manage the rates of incoming events to be processed by these applications. Depending on the computing resources available to each of the event-processing applications 813-815 and its capacity, the application might use the Flow-Control function 827 to increase or decrease the rate of the events being processed by the application.

Figure 9:
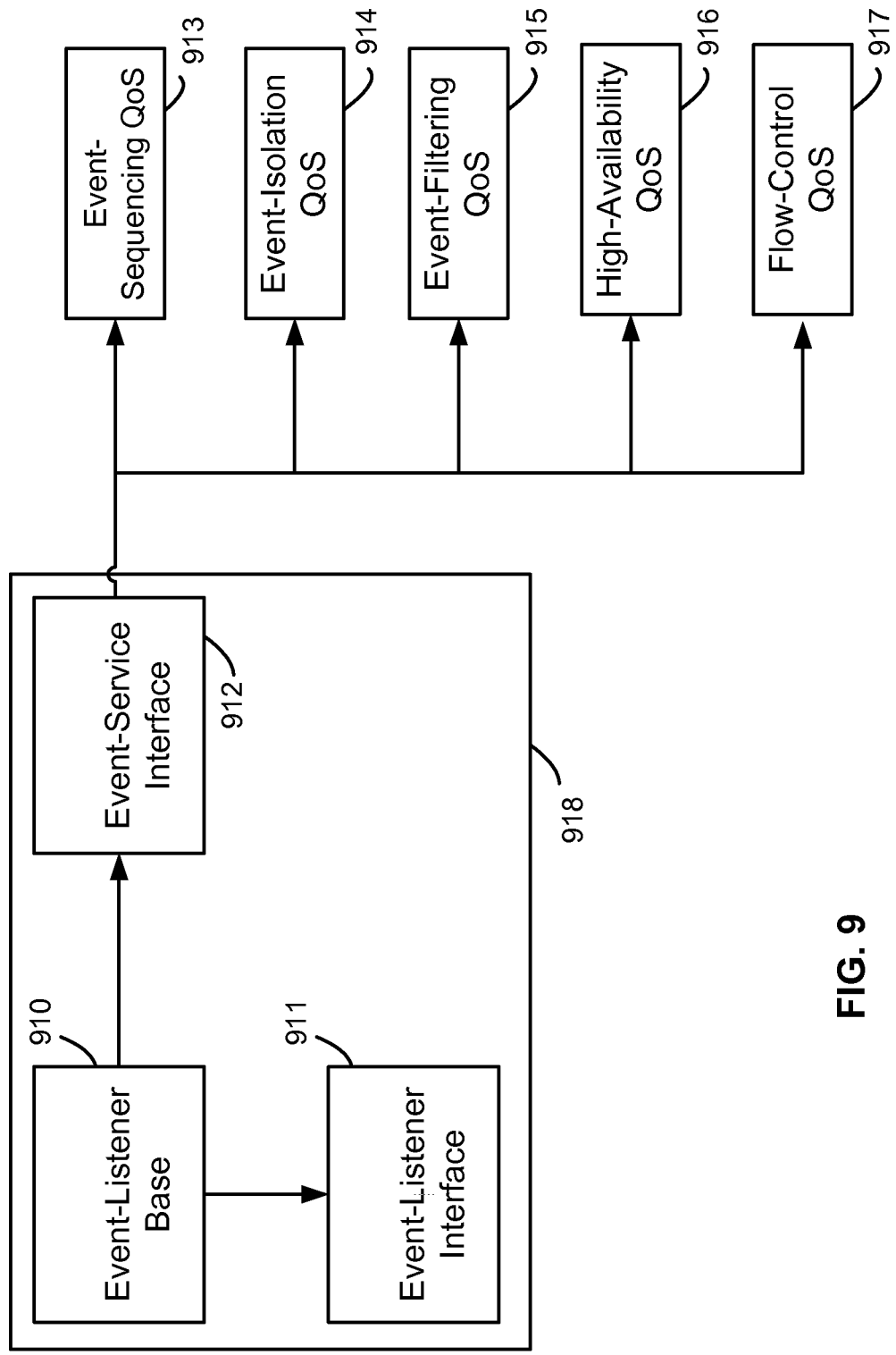
FIG. 9 is a is a block diagram representing an exemplary embodiment of the Event-Listener interface, the Event-Service interface and a set of Quality-of-Service functions, in accordance with aspects of the invention.

FIG. 9 is a block diagram showing a preferred embodiment of an Event-Listener base in an event-processing application 918, for invoking the Event-Listener and Event-Service interfaces, in accordance with aspects of the invention. An Event-Listener base 910 is provided with the application 918 and is coupled to its Event-Listener interface 911 for examining the incoming events being processed. If the Event-Listener base 910 determines that one or more Quality-of-Service functions are applicable to this application, then the base 910 invokes the Event-Service interface 912. Depending on the type of Quality-of-Services needed, one or more Quality-of-Service functions might be initiated by the Event-Service interface 912. For example, FIG. 9 shows the following Quality-of-Service functions: Event-Sequencing 913, Event-Isolation 914, Event-Filtering 915, High-Availability 916, and Flow-Control 917. These Quality-of-Service functions have previously been described in reference to FIGS. 4-8. Other Quality-of-Service functions may be added to the system to support the event-processing applications in the system, using the same base 910, the Event-Listener interface 911 and the Event-Service interface 912.

Figure 10:
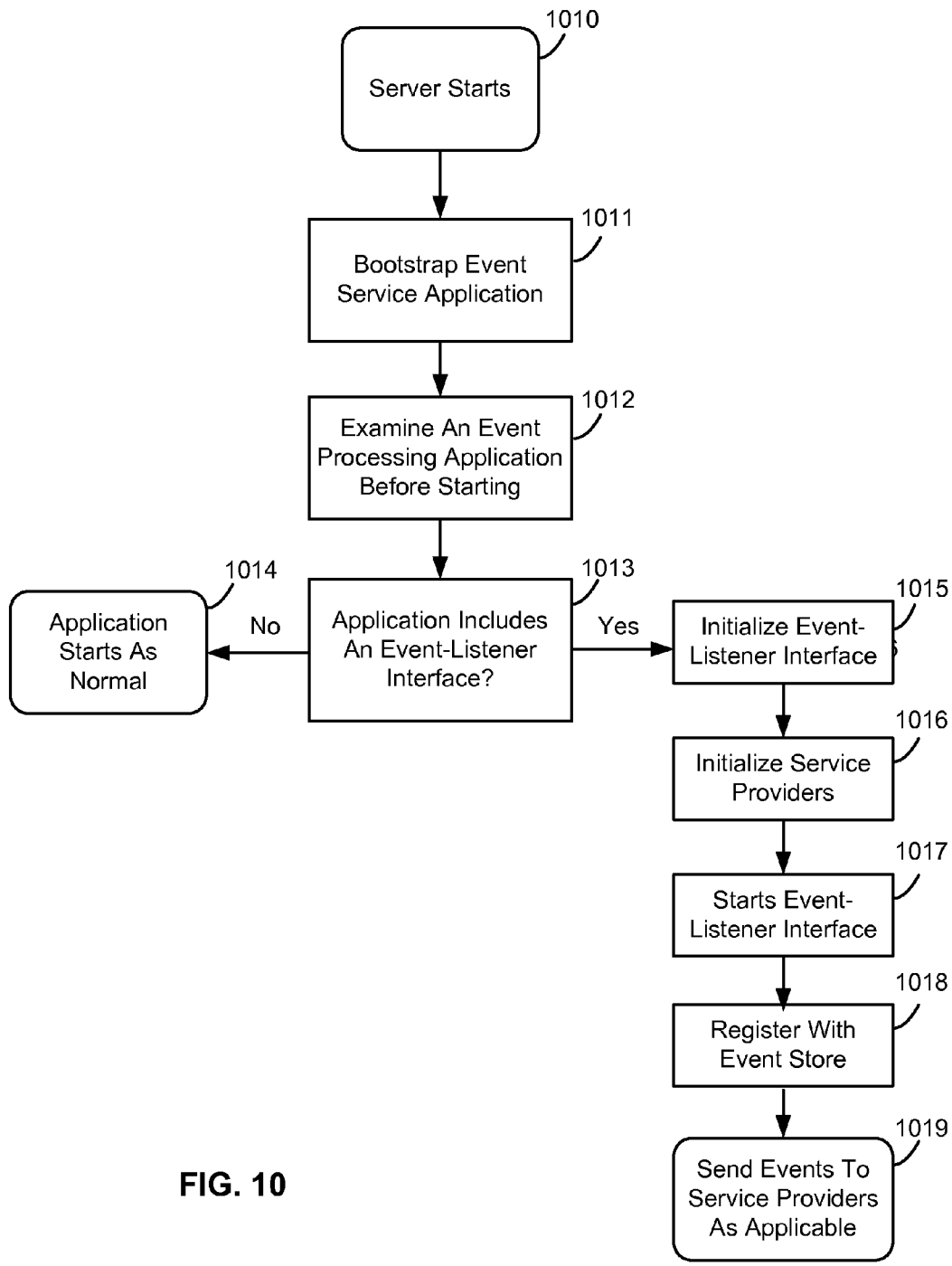
FIG. 10 is a flow chart representing an exemplary process for providing the Quality-of-Service functions to the event-processing applications, in accordance with aspects of the invention.

FIG. 10 is a flow chart representing an exemplary process for providing Quality-of-Service functions in a multi-processing environment that has multiple event-processing applications running concurrently, which has been described so far. At block 1010, the server that hosts an event-processing application starts the process. At block 1011, the Event-Service interface is bootstrapped. At block 1012, the Event-Service interface examines an event-processing application before the application is started. The Event-Service interface determines whether the event-processing application includes an Event-Listener interface at block 1018. If there is no Event-Listener interface, then the event-processing application is started as normal, at block 1014. Otherwise, the Event-Listener interface is initialized at block 1015. The service providers supporting the event-processing application are also initialized at block 1016. The Event-Listener interface then starts at block 1017. At block 1018, the Event-Service interface registers with the event store supporting the application so that the event store is ready to accept event data generated by the service providers. The events that need QoS functions are sent by the Event-Service interface to the service providers for handling at block 1019.

Figure 11:
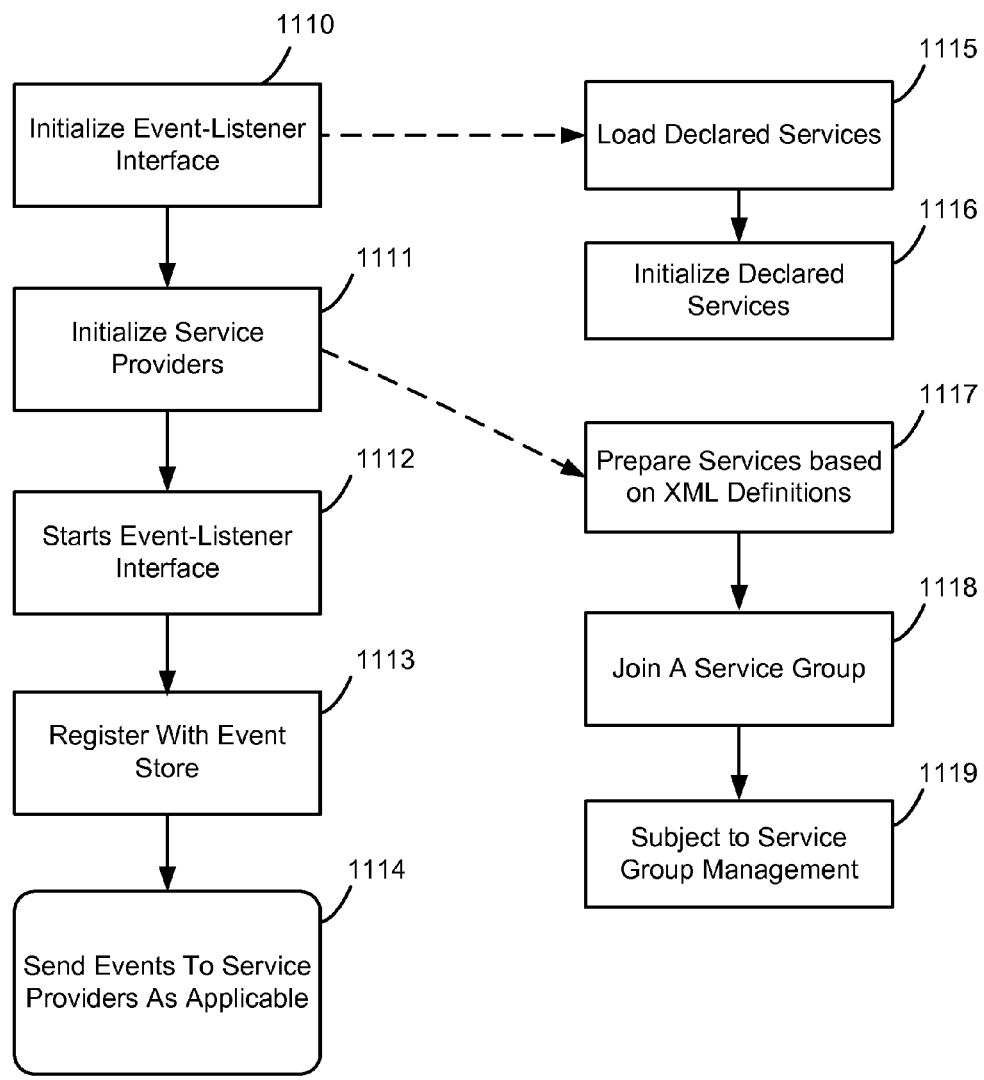
FIG. 11 is a flow chart showing further details of the process for providing the Quality-of-Service functions depicted in FIG. 10, and an exemplary process for providing the High-Availability Quality-of-Service function, in accordance with aspects of the invention.

FIG. 11 is a flow chart showing further details of the operations performed in FIG. 10, for an exemplary process for providing Quality-of-Services functions in a multi-processing environment. As part of the initialization of the Event-Listener interface at block 1110, the Event-Listener interface loads the declared services at block 1115. The declared services are then initialized at block 1116. The flow continues at block 1111 in which the service providers are initialized. In the preferred embodiments of the invention, the initialization of the service providers includes the preparation of the services based on their XML definitions at block 1117. In addition, the service providers join a service group at block 1118 and come under the control of the service group at block 1119. Once the initialization of the service providers at block 1111 is completed, the Event-Listener interface is started at block 1112. The Event-Listener next registers with the event store at block 1113. All events that require Quality-of-Service support are then sent to the applicable service providers for services at block 1114.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A multi-processing database system for providing Quality-of-Service functions, comprising:
    a processor;
    a plurality of concurrent database event-processing applications operable on the processor in which each of the plurality of event-processing applications includes a corresponding event-listener interface and event-service interface;
    wherein each of the plurality of event-listener interfaces is configured to identify a Quality-of-Service function applicable to the corresponding each database event-processing application, wherein the Quality-of-Service function includes an event-sequencing service for managing the order of finance related transactional events being processed by the corresponding each database event-processing application; and
    wherein each of the plurality of event-service interfaces is accessible from the each of the plurality of event-listener interfaces which belongs to the same corresponding event-processing application for providing the Quality-of-Service function to said each database event-processing application.

2. The system of claim 1, wherein the event-service interface includes a component for loading and activating the identified Quality-of-Service function.

3. The system of claim 1, wherein the Quality-of-Service function is an Event-Isolation service which identifies and isolates related events to avoid a racing condition among at least two of the concurrent event-processing applications.

4. The system of claim 1, wherein the Quality-of-Service function is a High-Availability service for handling fail-over conditions in the system.

5. The system of claim 1, wherein the Quality-of-Service function is an Event-Filtering service which selectively filters at least some of the finance related transactional events for which another Quality-of-Service function is to be applied and wherein the remaining of the finance related transactional events omit said another Quality-of-Service function.

6. The method of claim 1, wherein the Event-Isolation service identifies the related events which are to be applied to the same financial account and isolates the identified events.

7. The method of claim 1, wherein the finance related transactional events relate to an online reservation.

8. The method of claim 1, wherein the plurality of the concurrent event processing applications share the same Quality-of-Service function and are executed on separate servers such that one server is an active server and the remaining of the separate servers are backup servers.

9. The method of claim 1, wherein the Quality-of-Service function is a part of a database container applicable to the plurality of the concurrent event processing applications or is part of middleware that supports the plurality of the concurrent event processing applications.

10. A computer-implemented method for providing Quality-of-Service functions in a multi-processing database system having a plurality of concurrent database event-processing applications in which each of the plurality of event-processing applications includes a corresponding event-listener interface and event-service interface, the method comprising:
    identifying a Quality-of-Service function applicable to each database event-processing application using each of the event-listener interfaces, wherein the Quality-of-Service function includes an event-sequencing service for managing the order of finance related transactional events being processed by said each database event-processing application; and
    invoking the Quality-of-Service function using each of the event-service interfaces, each of the event-service interfaces being accessible from each of the event-listener interfaces.

11. The method of claim 10, wherein the Quality-of-Service function is provided based on a set of service definitions.

12. The method of claim 10, further comprising:
loading the Quality-of-Service function when the event-service interface invokes the Quality-of-Service function; and
activating the Quality-of-Service function.

13. The method of claim 12, wherein the activation of the Quality-of-Service function includes initializing the event-service interface.

14. The method of claim 13, wherein the initialization of the event-service interface includes initializing a set of declared services.

15. The method of claim 10, further comprising: loading a service provider associated with the Quality-of-Service function; and
sending an event to the service provider for processing.

16. The method of claim 10, wherein the Quality-of-Service function is an Event-Isolation service for managing the processing of the finance related transactional database events to avoid a racing condition among the applications.

17. The method of claim 10, wherein the Quality-of-Service function is a High-Availability service which handles fail-over conditions by providing backup processing channels from the event-processing applications.

18. The method of claim 10, wherein the Quality-of-Service function is an Event-Filtering service for selectively applying another Quality-of-Service function to a subset of incoming database events to improve system performance.

19. A computer program product for use in a multi-processing database system having a plurality of concurrent database event-processing applications in which each of the plurality of event-processing applications includes a corresponding event-listener interface and event-service interface, the product comprising a non-transitory computer usable storage medium having readable program code embodied in the storage medium, said program code operable to:
identify a Quality-of-Service function applicable to each database event-processing application using each of the event-listener interfaces, wherein the Quality-of-Service function includes an event-sequencing service for managing the order of finance-related transactional events being processed by said each database event-processing application; and
invoke the Quality-of-Service function using each of the event-service interfaces, each of the event-service interfaces being accessible from each of the event-listener interfaces.

20. The computer program product of claim 19, wherein the Quality-of-Service function is provided based on a set of service definitions.

21. The computer program product of claim 20, wherein said program code comprises program code operable to:
load the Quality-of-Service function when the event-service interface invokes the Quality-of-Service function; and
activate the Quality-of-Service function.

22. The computer program product of claim 21, wherein said program code operable to activate the Quality-of-Service function includes program code operable to initialize the event-service interface.

23. The computer program product of claim 22, wherein said program code operable to initialize includes program code operable to initialize a set of declared services.

24. The computer program product of claim 19, wherein said program code includes program code operable to:
load a service provider associated with the Quality-of-Service function; and send an event to the service provider for processing.

25. The computer program product of claim 19, wherein the Quality-of-Service function is a High-Availability service for handling fail-over conditions.

26. The computer program product of claim 19, wherein the Quality-of-Service function is an Event-Filtering service for selectively applying another Quality-of-Service function to a subset of incoming database events to improve system performance.

* * * * *